(12) United States Patent
Imai

(10) Patent No.: US 8,525,899 B2
(45) Date of Patent: Sep. 3, 2013

(54) IMAGE-CAPTURING DEVICE, USER INTERFACE AND METHOD FOR SELECTIVE COLOR BALANCE ADJUSTMENT

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 12/789,334

(22) Filed: May 27, 2010

(65) Prior Publication Data

US 2011/0292237 A1 Dec. 1, 2011

(51) Int. Cl.
*H04N 9/73* (2006.01)
*H04N 5/228* (2006.01)
*G06K 9/00* (2006.01)
*G06K 9/34* (2006.01)

(52) U.S. Cl.
USPC ............. 348/223.1; 348/225.1; 348/222.1; 382/167; 382/162; 382/173

(58) Field of Classification Search
USPC 348/222.1, 223.1, 225.1, 362; 382/162–167, 382/173–180
See application file for complete search history.

(56) References Cited

U.S. PATENT DOCUMENTS

| | | | |
|---|---|---|---|
| 5,874,988 A * | 2/1999 | Gu | 348/97 |
| 7,239,760 B2 * | 7/2007 | Di Bernardo et al. | 382/305 |
| 2005/0094891 A1 | 5/2005 | Stavely et al. | |
| 2006/0007346 A1 | 1/2006 | Nakamura | |
| 2007/0291152 A1 * | 12/2007 | Suekane et al. | 348/333.02 |

OTHER PUBLICATIONS

U.S. Appl. No. 12/789,323, filed May 27, 2010, Francisco Imai, Publication No. 2011-0292242, Publication date Dec. 1, 2011.

* cited by examiner

*Primary Examiner* — Sinh Tran
*Assistant Examiner* — Mark Monk
(74) *Attorney, Agent, or Firm* — Canon USA Inc. IP Division

(57) ABSTRACT

There is provided a user interface on a display unit of an image-capturing device for selective color balance adjustment of an image. The user interface allows for an image to be divided into a plurality of regions. A user may select one or more regions on the user interface. The user interface also includes a control unit for adjusting a color balance value for each of the selected regions on the user interface based on user input. The user interface allows for adjustment of the color balance value for different regions of an image prior to the image being written onto a recording medium by the image-capturing device.

24 Claims, 5 Drawing Sheets

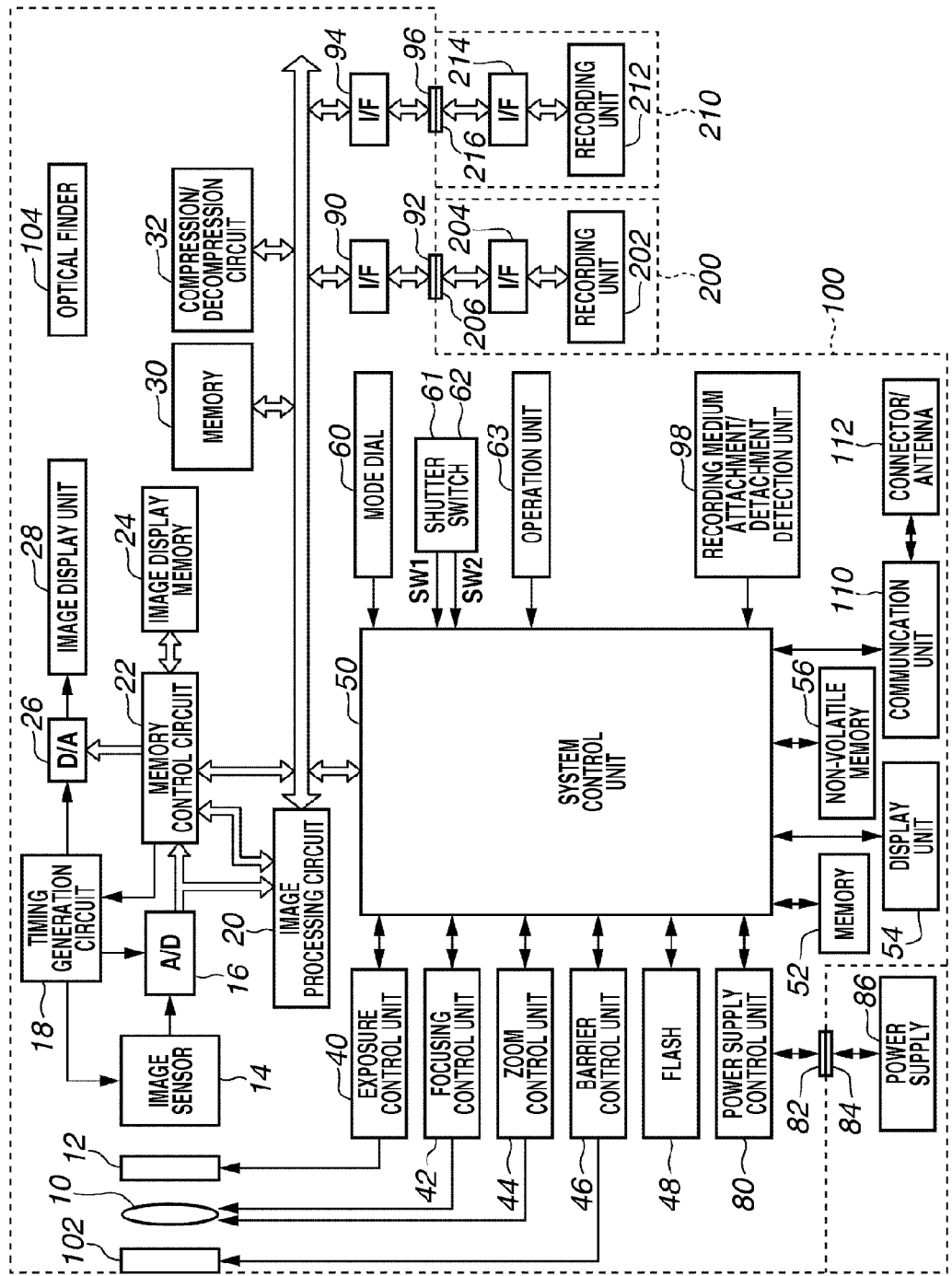

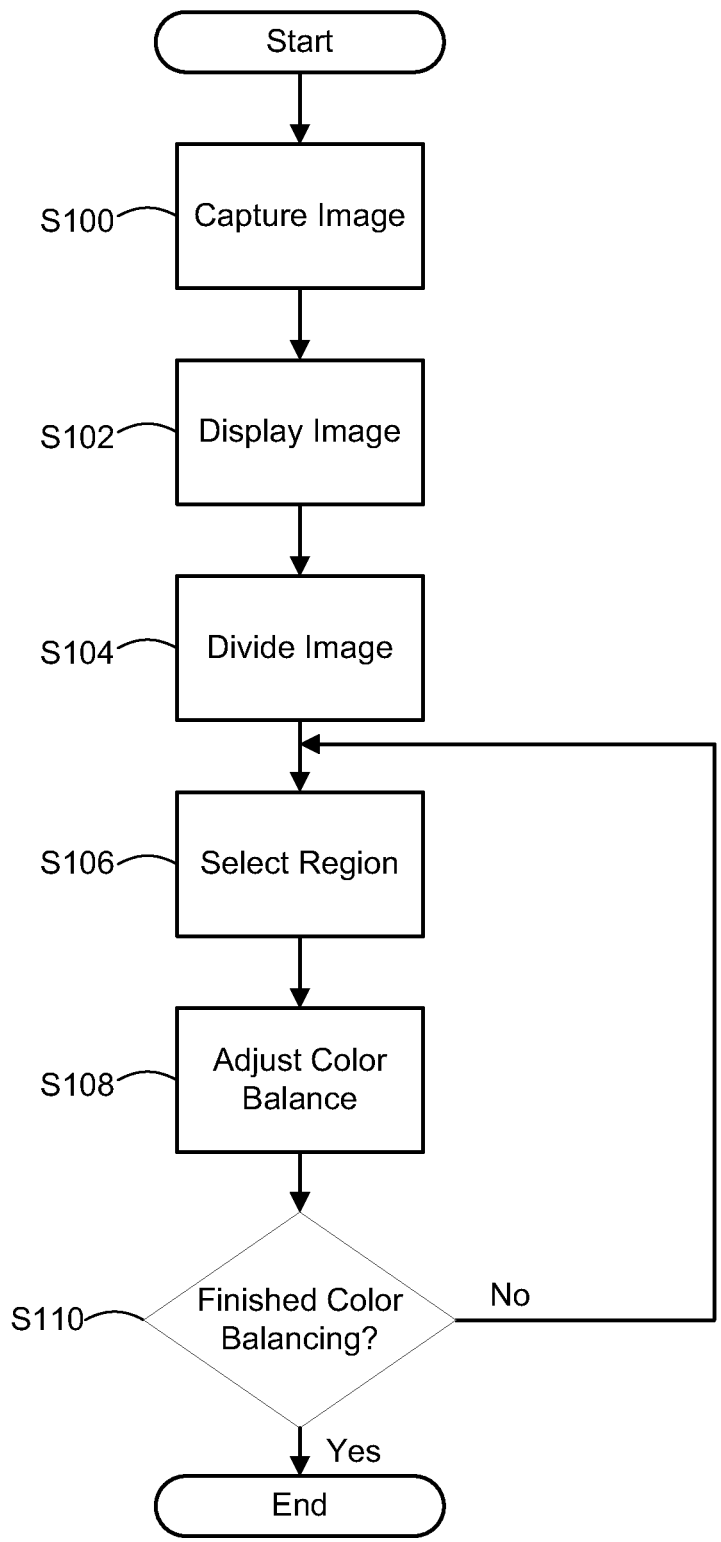

FIG. 5

| COLOR BALANCE MODE | CORRELATED COLOR TEMPERATURE (K:KELVIN) |
|---|---|
| AUTO (HIGH LUMINANCE) | 5200 K |
| AUTO (LOW LUMINANCE) | 3200 K |
| SUNLIGHT | 5200 K |
| CLOUDINESS | 6000 K |
| ELECTRIC BULB | 3200 K |
| FLUORESCENT LIGHT (NATURAL DAYLIGHT) | 4000 K |
| FLUORESCENT LIGHT H (DAYLIGHT) | 5500 K |
| FLASH | 6000 K |

# IMAGE-CAPTURING DEVICE, USER INTERFACE AND METHOD FOR SELECTIVE COLOR BALANCE ADJUSTMENT

BACKGROUND OF THE INVENTION

1. Field of the Invention

The present invention relates to an image-capturing device, user interface and method for selective color balance adjustment of an image.

2. Description of the Related Art

In photography and image processing, color balancing is the global adjustment of color intensities in order to adjust specific colors, particularly neutral colors, correctly. Color balance changes the overall mixture of colors in an image for color correction. Color balance is a generalized version of white balance used to get colors other than neutrals to appear accurate or aesthetically pleasing.

Image data acquired by sensors—either film or electronic image sensors—may be transformed from the acquired values to new values that are appropriate for color reproduction or display. Several aspects of the acquisition and display process make such color correction essential—including the fact that the acquisition sensors do not match the sensors in the human eye, that the properties of the display medium must be accounted for, and that the ambient viewing conditions of the acquisition differ from the display viewing conditions.

Human visual perception works well in achieving color balance by perceptual and cognitive mechanisms. However, image-capturing devices such as digital cameras do not perform color balance automatically. There are methods to automatically white balance (AWB) an image by using active lighting, as described in the Dalton et al. patent (U.S. Pat. No. 7,394,488), issued on Jul. 1, 2008. Another method for AWB of an image includes inferring image content, e.g. by detecting human facial region, as proposed in the Berge et al. application (US Patent Application Publication No. 2004/0208363), filed on Apr. 21, 2003. Adjusting color balance on a pixel selective basis is proposed by the Hubina et al. patent (U.S. Pat. No. 6,876,384), issued on Apr. 5, 2005.

Automatic color balancing is not always desirable because it is away to standardize output so a theoretical white card in the image would look white under any illuminant. This automatic feature may undermine the artistic intent of the photographer. For example, an intensely red sunset picture should not be color balanced because it may result in a very bland picture by de-saturating color. Although manual color balance exists in more advanced digital cameras, it is limited to adjustment of global illuminant (tungsten, daylight, fluorescent light, overcast sky or, in professional cameras, correlated color temperature adjustment). The Sakaguchi et al. patent (U.S. Pat. No. 7,212,234), issued on May 1, 2007, discloses a manual color balance graphical user interface using a touch screen.

In scenes with multiple illuminant it can be frustrating to capture images of the scenes because of the varying degree in illuminant. For example, a scene illuminated by a dark blue sky and a near horizontal sun light will have multiple illuminants. In particular, the illuminant from the dark blue sky could have a correlated color temperature (CCT) of 20,000 Kelvin (K), while the portion of the scene illuminated by the near horizontal sun light could have a CCT near 2,000 K. If the global color balance is adjusted considering the dark blue sky it would make the portion of the image illuminated by horizontal sun light even yellower. If the global color balance is adjusted considering the yellowish portion of the scene illuminated by the horizontal rays coming from the sun, the dark shadows would look even bluer. Any global color balance using a compromise of CCT between both extremes would make the colors in both regions incompletely corrected. Therefore, there is no ideal global solution for color balance for such a scene.

Conceptually, color balancing consists of two steps: first, determining the illuminant under which an image was captured; and second, scaling the components (e.g., R, G, and B) of the image or otherwise transforming the components so they conform to the viewing illuminant. The color balance operations in popular image editing applications usually operate directly on the red, green, and blue channel pixel values, without respect to any color sensing or reproduction model. A satisfactory image may be produced manually after time-consuming adjustments using image-editing software.

Where there are ways to control color balance pixel by pixel, there does not exist an interface for a user of an image-capturing device to specify which region of the image to color balance and to what degree of color balancing the user would like the image-capturing device to carry out. As a result, photographers rely heavily on post-processing to get desired results. However, if the digital camera shot the image with inappropriate color balance, it is very difficult to correct it regardless of the image editing software. Furthermore, automatic global corrections of complex scenes illuminated by multiple illuminants with very different CCTs tend to produce images that have wrong color balance.

Color balance may refer to correction for differences in the ambient illuminant conditions. However, the algorithms for transforming the data do not always clearly describe the adjustments needed to account for differences between the sensors and the human eye. Hence, it can be difficult to assign color balance to a specific step in the color correction process. Moreover, there can be significant differences in the color-balancing goal. Some applications produce an accurate rendering. In other applications, the goal of color balancing is to produce an aesthetically pleasing rendering. Photographers may deliberately set-up "wrong" CCT or illuminant in the manual color balance to produce an aesthetically pleasant image. For example, a scene with sunset has low CCT but the photographer deliberately sets up a high CCT (or an illuminant with higher CCT in the camera control) so the camera applies a red shift into the image exacerbating the yellowish-reddish look of the scene to convey an even warmer feeling of the scene.

Most digital cameras have a means to select a color correction based on the type of scene illuminant, using either manual illuminant selection, or AWB, or custom white balance. However, such selections are performed globally to the whole image. Setting a button on a camera is a way for the user to indicate to the processor the nature of the scene lighting. Another option on some cameras is a button pressed with the camera pointed at a gray card or other neutral object. This "custom white balance" step captures an image of the ambient light, and this information is helpful in controlling color balance.

Once an image is captured with inadequate or non-desirable color balance it often has saturated color channels. This means that information is lost and there is no way to recover information lost in the capture. This means it is advantageous to get desired color balance at the time an image is captured, rather than edit later on a monitor using image-editing software.

Accordingly, an intuitive method to select different regions of an image and apply varying degrees of manual color balance would be advantageous and would reduce the need for post-processing color balance correction and at the same time would enable multi-illumination color balance adjustment.

SUMMARY OF THE INVENTION

According to an aspect of the present invention, an image-capturing device is provided. The image-capturing device includes an imaging unit configured to capture an image and acquire image data. The image-capturing device includes a display unit configured to display the image. The image-capturing device also includes a control unit configured to divide the image displayed into a plurality of regions and adjust a color balance value of a selected region from the plurality of regions. Each region from the plurality of regions may have the color balance value adjusted on an individual basis rather than a global color balance adjustment.

According to another aspect of the present invention, a method for selective color balance adjustments on an image-capturing device is provided. The method may begin by displaying an image based upon acquired image data. The method continues by dividing the image into a plurality of regions and selecting a region from the plurality of regions. The method may conclude by adjusting a color balance value of the selected region.

According to yet another aspect of the present invention, a user interface on a display unit of an image-capturing device for selective color balance adjustment of an image is provided. The user interface includes a plurality of regions and a control unit configured to select a region from the plurality of regions and adjust a color balance value of the region selected from the plurality of regions based on a user input. A user can adjust the color balance value of the various regions by providing inputs via the user interface.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating an image-capturing device;

FIG. 2 is a flowchart illustrating an operation for selective color balance adjustment of an image on an image-capturing device;

FIG. 5 is a table indicating color corrected temperatures associated with a particular illuminant.

DESCRIPTION OF THE EMBODIMENTS

Figure 3A:
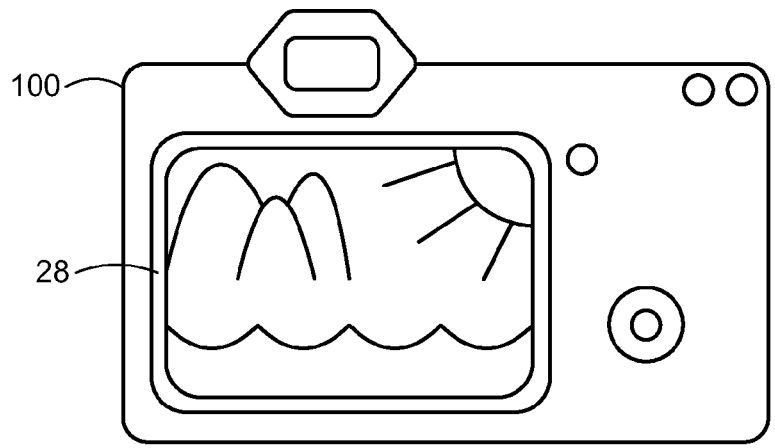
FIG. 3A illustrates an image being displayed on a display unit of the image-capturing device of FIG. 1.

Various exemplary embodiments, features, and aspects of the invention will be described in detail below with reference to the drawings.

FIG. 1 illustrates a configuration of an image-capturing device according to an exemplary embodiment of the present invention.

An image-capturing device 100 for selective color balance adjustment includes a protection unit 102, photographic lens 10, a shutter 12, an image sensor 14, an analog to digital (A/D) converter 16, a timing generation circuit 18, and an image processing circuit 20. The protection unit 102 serves as a cover to protect an imaging unit including the photographic lens 10 from soiling and breakage. The shutter 12 includes a diaphragm function. The image sensor 14 converts an optical image to electric signals. The A/D converter 16 converts an analog signal output from the image sensor 14 to a digital signal. The timing generation circuit 18 supplies a clock signal and a control signal to the image sensor 14, the A/D converter 16, and a digital to analog (D/A) converter 26. A memory control circuit 22 and a system control unit 50 control the timing generation circuit 18.

The image processing circuit 20 performs predetermined pixel interpolation and color conversion on data received from the A/D converter 16 or the memory control circuit 22. Further, the image processing circuit 20 performs a predetermined calculation using the captured image data.

The image-capturing device 100 further includes the memory control circuit 22, an image display memory 24, the D/A converter 26, and an image display unit 28.

The memory control circuit 22 controls the A/D converter 16, the timing generation circuit 18, the image processing circuit 20, the D/A converter 26, a memory 30 and a compression/decompression circuit 32. The data of the A/D converter 16 is written in the image display memory 24 or the memory 30 via the image processing circuit 20 and the memory control circuit 22, or via the memory control circuit 22.

The image display unit 28 is, for example, a thin-film transistor (TFT) liquid crystal display (LCD). Image data for display, which is written in the image display memory 24, is displayed on the image display unit 28 via the D/A converter 26. An electronic finder function can be implemented by sequentially displaying the captured image data using the image display unit 28. Further, the image display unit 28 can arbitrarily switch a display screen on and off according to an instruction from a system control unit 50. If the image display unit 28 turns off the display, power consumption of the imaging apparatus 100 can be greatly reduced.

The image-capturing device 100 further includes the memory 30, the compression/decompression circuit 32, an exposure control unit 40, a focusing control unit 42, a zoom control unit 44, a barrier control unit 46, a flash unit 48, and the system control unit 50.

The memory 30 stores captured still images and moving images. The memory 30 has a storage capacity large enough to store a predetermined number of still images and a moving image corresponding to a predetermined period of time. Therefore, a large amount of image data can be written in the memory 30 at high speed in both a continuous shooting mode of continuously shooting a plurality of still images. Further, the memory 30 can be used as a work area of the system control unit 50.

The compression/decompression circuit 32 compresses and decompresses the image data using adaptive discrete cosine transform (ADCT). The compression/decompression circuit 32 reads an image stored in the memory 30 and compresses or decompresses the image, and writes the processed data in the memory 30.

The system control unit 50 controls the image-capturing device 100. The exposure control unit 40 controls the shutter 12, which includes the diaphragm function. Further, the exposure control unit 40 includes a flash light amount control function in cooperation with the flash unit 48. The focusing control unit 42 controls focusing of the photographic lens 10. The exposure control unit 40 and the focusing control unit 42 are controlled by a TTL system.

More specifically, the system control unit 50 performs auto-focus (AF) processing, automatic exposure (AE) processing, and electronic flash pre-emission (EF) processing according to the TTL system by controlling the exposure control unit 40 and the focusing control unit 42 based on a calculation result obtained by the image processing unit 20. The zoom control unit 44 controls zooming of the photographic lens 10. The barrier control unit 46 controls an operation of the protection unit 102. The flash unit 48 includes a function of emitting AF auxiliary light and the light amount control function.

Moreover, the image-capturing device 100 includes a memory 52, a display unit 54, and a non-volatile memory 56.

The memory 52 stores constants, variables, and programs to be used in operations of the system control unit 50. Further, the memory 52 stores a program diagram to be used in the AE processing. The program diagram is a table which defines a relationship between an aperture diaphragm diameter corresponding to an exposure value and a control value of shutter speed.

The display unit 54 may include an LCD or a speaker which displays an operation state or a message using characters, images, and sound according to execution of a program by the system control unit 50. One display unit 54 or a plurality of display units 54 may be provided near an operation unit 63 of the imaging-capturing device 100 so that it is easily visible for a user. The display unit 54 may be configured as a combination of an LCD, a light-emitting diode (LED), and a sound generator. A part of the functions of the display unit 54 is installed within an optical finder 104.

Display contents of the display unit 54 which are displayed on the LCD may include indications of single shot/continuous shooting, self timer, a compression rate, a number of recorded pixels, a number of recorded shots, a remaining number of shots, a shutter speed, an aperture value, and exposure correction. Further, the display unit 54 may display on the LCD, indications such as, flash, red-eye reduction, macro shooting, buzzer setting, remaining amount of a clock battery, remaining amount of batteries, error information, information in a plurality of digits, a detached/attached state of a recording medium, a communication interface operation, and date and time.

The display contents of the display unit 54 which are displayed in the optical finder 104 may include indications of in-focus, camera-shake warning, flash charge, shutter speed, aperture value, and exposure correction.

The non-volatile memory 56 is an electrically erasable and recordable memory such as an electrically erasable programmable read-only memory (EEPROM).

The image-capturing device 100 further includes a mode dial 60, a shutter switch (SW1) 61, a shutter switch (SW2) 62, and the operation unit 63 which are input units for a user to input various operation instructions to the system control unit 50. Such input units are configured with a single device such as a switch, a dial, a touch panel, pointing using line-of-sight detection, and a speech recognition apparatus or a combination of a plurality of these devices.

The mode dial 60 can be used to specify switching between functional modes such as power off, automatic shooting mode, shooting mode, panoramic shooting mode, reproduction mode, multiple screen reproducing/erasing mode, and personal computer (PC) connection mode.

The shutter switch (SW1) 61 is switched on by a half stroke of a shutter button (not illustrated) and instructs start of AF processing, AE processing, AWB processing, and EF processing.

The shutter switch (SW2) 62 is switched on by a full stroke of the shutter button (not illustrated) and instructs start of a series of processing. The series of processing include exposure processing to write signals read from the image sensor 14 into the memory 30 via the A/D converter 16 and the memory control circuit 22, developing processing employing calculations performed by the image processing circuit 20 and the memory control circuit 22, selective color balance processing and recording processing. In the recording processing, the image data read from the memory 30 is compressed by the compression/decompression circuit 32. The image data is then written onto the recording media 200 and 210.

The operation unit 63 includes various buttons and touch panels, such as a menu button, a set button, a macro selection button, a multi-screen reproduction and page-advance button, a flash setting button, and a single-shot/serial-shot/self-timer selection button. Further, the operation unit 63 includes a forward (+) menu item selection button, a backward (−) menu item selection button, a forward (+) reproduction image search button, a backward (−) reproduction image search button, a shooting quality selection button, an exposure correction button, and a date/time set button.

The image-capturing device 100 further includes a power supply control unit 80, connectors 82 and 84, a power supply 86, interfaces 90 and 94, the optical finder 104, a communication unit 110, a connector (antenna) 112, and a recording medium attachment/detachment state detection unit 98.

The power supply control unit 80 includes a battery detection circuit, a direct current (DC)-DC converter, and a switch circuit for switching the blocks to be energized. The power supply control unit 80 detects the attached/detached state of the battery, a battery type and the remaining battery power level, and controls the DC-DC converter based on the detection result and an instruction from the system controller 50. The power supply control unit 80 then supplies a necessary voltage for a necessary period to each of the units including the recording medium. The power supply 86 may include a primary battery such as an alkaline battery or a lithium battery, a secondary battery such as a BNiCd battery, an NiMH battery, or an Li battery, and an alternate current (AC) adapter.

Interfaces 90 and 94 transmit and receive data to and from the recording media 200 and 210 such as a memory card or a hard disk. The connectors 92 and 96 connect the image-capturing device 100 and the recording media 200 and 210. The recording medium attachment/detachment detection unit 98 detects whether the recording medium 200 or the recording medium 210 is connected to the connector 92 or the connector 96. There are two systems of interfaces and connectors for attaching the recording medium. However, there can be any number of systems of interfaces and connectors for attaching the recording medium. Further, interfaces and connectors pursuant to different standards may be combined.

Cards in conformity with Personal Computer Memory Card International Association standards (PCMCIA cards) or cards in conformity with compact flash (CF) card standards may be used as the interfaces and connectors. In such a case, various communication cards such as a local area network (LAN) card, a modem card, a universal serial bus (USB) card, an Institute of Electrical and Electronics Engineers (IEEE) 1394 card, a P1284 card, a small computer system interface (SCSI) card, and a personal handyphone system (PHS) can be connected. According to this configuration, image data and management information attached to the image data can be transmitted and received between other peripheral devices such as a computer and a printer.

The optical finder 104 is a window for confirming an object to be captured without using the electronic viewfinder function of the image display unit 28. A part of the functions of the display unit 54 including an indication of in-focus state, a camera shake warning, a flash charge state, a shutter speed, an aperture value, and exposure correction are displayed inside the optical finder 104.

The communication unit 110 includes various communication functions such as Recommended Standard (RS) 232C, USB, IEEE 1394, P1284, SCSI, modem, LAN, and wireless communication.

The connector (antenna) 112 connects the image-capturing device 100 with other devices via the communication unit 110. The connector 112 functions as an antenna when performing wireless communication.

The recording media 200 and 210 such as the memory card or the hard disk are detachably attached to the image-capturing device 100. The recording media 200 and 210 include recording units 202 and 212 configured by a semiconductor memory or a magnetic disk, and interfaces 204 and 214 respectively. Further, the recording media 200 and 210 includes connectors 206 and 216 for connecting with the image-capturing device 100.

The imaging-capturing device 100 may be configured in the form of, for example, a digital camera, a video camera, or any type of device including camera, such as a pager, a cellular telephone, a radio telephone, a personal digital assistant (PDA), a Moving Pictures Expert Group Layer 3 (MP3) player, and/or the like.

The processing performed for selective color balance adjustments before the image captured by the image-capturing device 100 is written onto the recording media 200 will be described below with reference to FIG. 2. The processing is started by capturing an image in step S100 using the image-capturing device 100, for example, by directing the lens 10 toward a scene such that the scene is displayed on the image display unit 28 as provided in the following step S102. The image is captured and displayed on the image display unit 28 before the shutter switch (SW2) 62 is switched on by a full stroke of the shutter button by a user of the image-capturing device 100.

The system control unit 50 starts display of the through-the-lens image via the image display unit 28 after completing the shooting preparation. When the through-the-lens image is displayed, the image data is sequentially written in the image display memory 24 via the image sensor 14, the A/D converter 16, the image processing circuit 20, and the memory control circuit 22. The written image data is then sequentially displayed on the image display unit 28 via the memory control circuit 22 and the D/A converter 26 to realize an electronic view finder function.

Still referring to FIG. 2, the next step in the flow chart is step S104 dividing the image that is displayed on the image display unit 28 of the image-capturing device 100. The image displayed is divided into a plurality of regions. The user of the image-capturing device may select the quantity of regions to divide the displayed image. The number of regions the image is divided into is adjustable by the user. The advantage of being able to decide how many regions the image displayed will be divided into, is the ability to divide the image according to the different illuminants associated with the scene that is captured. For example, if the displayed image includes two different illuminants, the user may divide the image into two regions. In another case, the displayed image may include three different illuminants; the user may divide the image into three regions. From a practical standpoint, the user may typically divide the image between two to six regions, depending on the color balance goals of the user and the various illuminants associated with the displayed image. Additionally, the user may adjust the size of the regions relative to the image displayed.

The system control unit 50 allows the user to divide the image into a plurality of regions and adjust the size of the regions if desired. The system control unit 50 receives instructions from the operation unit 63 to control the division of the image. The operation unit 63 receives inputs from the user. The user may provide various inputs and instructions to the operation unit 63 by buttons associated with the operation unit 63 and/or a touch screen on the image display unit 28 by way of example and not of limitation.

In step S106, the user selects a region from the plurality of regions that were created when the image was divided in the image display unit 28 of the previous step S104. If the image displayed was divided into two regions, then the user chooses one region from the two regions. If the image displayed was divided into three regions, the user selects one region from the three regions, and so on. The region may be selected by the user through an input via a button associated with the operation unit 63 which is then relayed to the system control unit 50. The user may also select the region by contacting the region of the image displayed on the image display unit 28 where the image display unit 28 is a touch screen.

Subsequent to the region being selected in step S106, a color balance value of the selected region is adjusted according step S108. The system control unit 50 controls the color balance value of the selected region after the image-capturing device 100 receives an input from the user via the operation unit 63 or the image display unit 28. Therefore, based on the user's input, an instruction is relayed to the system control unit 50 to adjust the color balance value of the selected region to be adjusted in accordance with the user's desires. This is advantageous, because the user may specify the color balance value associated with a specific region of the image displayed on the image display unit 28 rather than having to make a global color balance adjustment to the entire image displayed on the image display unit 28.

The user may adjust the color balance value for the selected region from a broad range of color balance values. Referring briefly to FIG. 5, a table is provided with correlated color temperature values in Kelvins associated with a particular color balance mode 701 of a scene or image to be captured and written onto a recording medium of the image-capturing device 100. The user may select the color balance value for the selected region based on the correlated color temperature that would normally be associated with a certain element within that portion of the region. Alternatively, the user may select a color balance value based on aesthetic concerns. The user by selecting a particular region to adjust the color balance value has the option to input a particular color balance value based on the user's goals. The color balance value selected by the user does not have to be correct nor does it have to take into consideration the aesthetic qualities of the image. The advantage is that the user has the ability to make color balance value selections for the selected region based on the user's preferences. An experienced photographer that is trying to achieve a particular aesthetic look may choose a color balance value for the region that normally would not be associated with the type of illuminant typically associated with a particular scene.

In the following step S110, the system control unit 50 determines whether color balancing adjustments have been completed. The system control unit 50 may determine if the color balance adjustments have concluded in a few different ways. The system control unit 50 can determine that the user has finished color balancing based on user input to the operation unit 63 or image display unit 28. When the system control unit 50 determines that color balance adjusting is not completed, the process proceeds by returning to step S106 where the user selects another region. Thus, for the example where the user divided the imaged into three regions, after adjusting the color balance value for one region, the user may continue by adjusting the color balance value of the second region, and possibly the third region. After all the regions have been selected or after a select quantity of regions have been selected and adjusted for color balance by the user, the process for selective color balance adjustments by the user through instructions directed to the system control unit 50 concludes.

Referring now to FIG. 3A, a rear view of an image-capturing device 100 with an image display unit 28 is provided. The image captured by the image-capturing device 100 and displayed on the image display unit 28 may include areas where the preferable correlated color temperature value may vary widely. For an image such as the one displayed, adjusting the color balance value globally may result in certain areas of the image where the color balance looks incorrect or not pleasing from an aesthetic point of view.

Figure 3B:
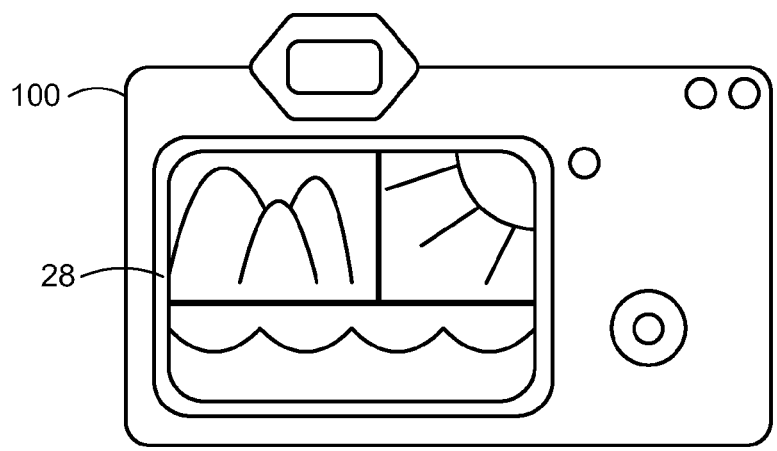
FIG. 3B illustrates the image of FIG. 3A being divided into a plurality of regions.

Referring now to FIG. 3B, the image displayed on the image display unit 28 has been divided into a plurality of regions. In particular, the image has been divided into three regions. In this example, the regions are not the same size, however, it is possible to divide the image into regions of equal size depending on the user's preference with respect to a particular image. In one region of the image, a landscape of mountains in the background is displayed. In another region, the sun is displayed. In a third region, a body of water is displayed. The user controlling the image-capturing device 100 may view the image displayed in the image display unit 28 as shown in FIG. 3A and decide that the color balance values for three different areas of the image should be adjusted. Through user inputs, the image is divided into three regions for the user to select and adjust the color balance values.

Figure 3C:
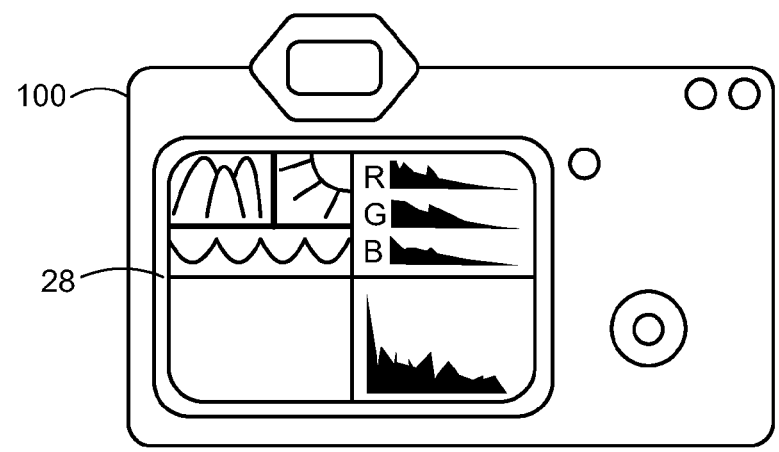
FIG. 3C illustrates a color histogram being displayed on the display unit subsequent to a region from FIG. 3B being selected.

Referring now to FIG. 3C, the image display unit 28 provides a user interface for selectively adjusting the color balance values of the various regions of the image. The image display unit 28 may include a histogram as shown in FIG. 3C. The histogram allows the user to select the appropriate color balance value for each region that the user intends on adjusting the color balance value. The histogram displayed on the image-display unit 28 provides a part of the user interface which simplifies the user's ability to adjust color balance values of regions selected by the user. After selecting one of the regions and entering a color balance value for the selected region, the user may then select a different region on the image display unit 28.

Figure 4:
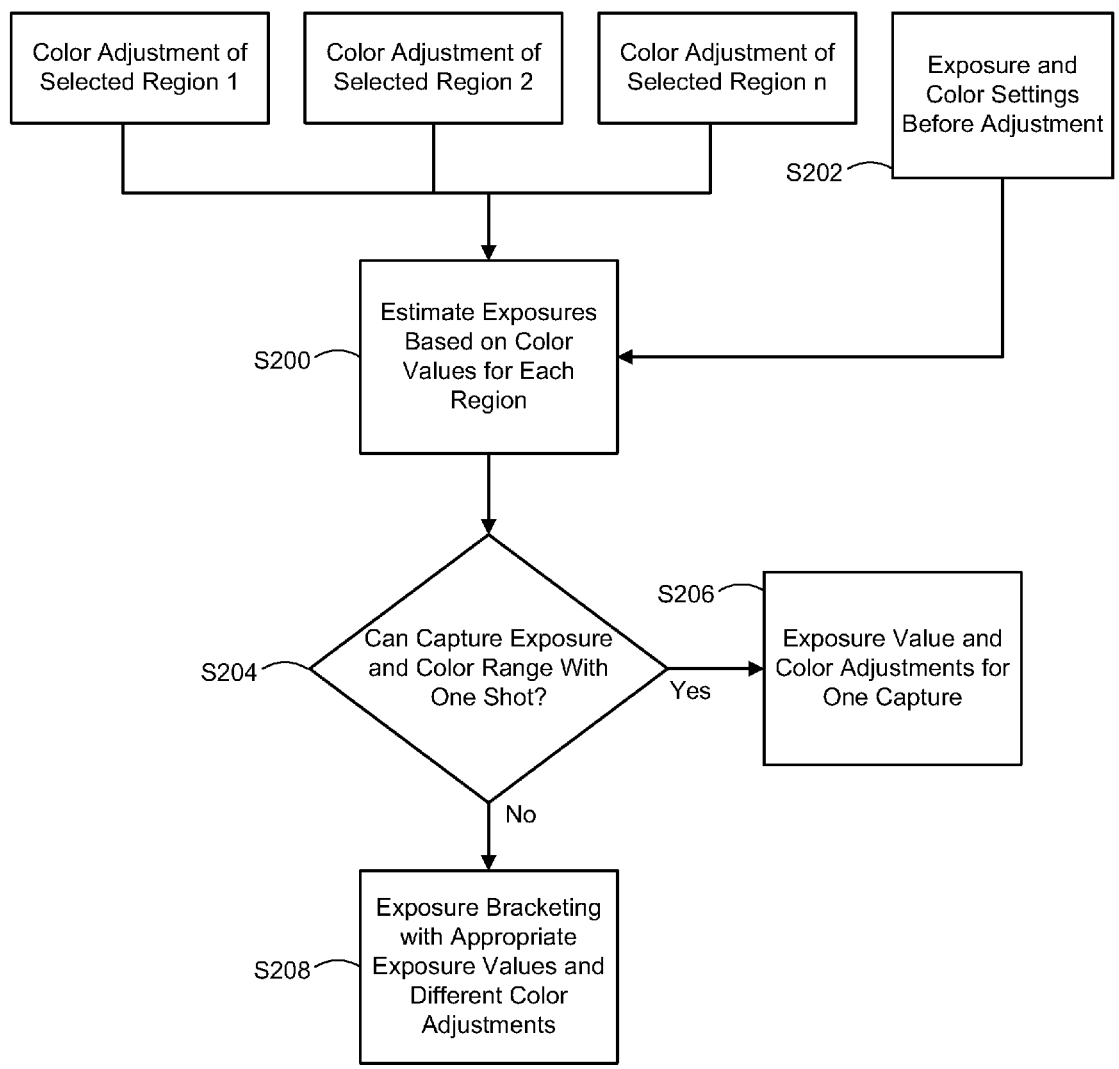
FIG. 4 is a flowchart illustrating whether the image-capturing device may capture the image using one shot based on color balance value adjustments made to the image.

Referring now to FIG. 4, a flow chart is provided that details the processing of the system control unit 50 after the color balance values have been adjusted by the user for the plurality of regions on the image display unit 28. The process is initiated with step S200 which calls for the system control unit 50 to estimate exposure value based on color values for each region. The system control unit 50 is able to estimate exposure values by initially referring to default exposure values and color settings that are stored within the memory 52 of the image-capturing device 100 as shown in step S202. In step S200, the system control unit 50 estimates the exposure value based on the color balance values provided by the user and the default values stored within the memory 52 of the image-capturing device 100. After the system control unit 50 estimates the exposure values, in step S204 the system control unit 50 determines whether the image-capturing device 100 can capture the image with the estimated exposure and color balance values with one shot. If the system control unit 50 determines that one shot is sufficient based on the exposure value and color balance values, then in step S206 the image is captured and written onto the recording medium 200. If the system control unit 50 determines that one shot is not sufficient based on the exposure value and color balance values, then in step S208 the image is captured with multiple shots. Capturing the image with multiple shots allows for exposure bracketing with appropriate exposure values and different color balance adjustments.

The advantage of the image-capturing device 100 as described above, is that it allows the user to adjust color balance values selectively rather than globally. The user interface associated with the image-capturing device 100 allows the user to view the image, divide the image into regions accordingly, and adjust the color balance values of individual regions to achieve correct or aesthetically desired color balancing. This is accomplished before the image data for the captured image is written onto the recording medium 200. The advantage being that the color balance adjustments are made pre-processing. Color balancing using post-processing image editing software is often time consuming and even then color balance adjustments are difficult compared to making color balance adjustments prior to writing the image data onto the recording medium 200.

While the present invention has been described with reference to exemplary embodiments, it is to be understood that the invention is not limited to the disclosed exemplary embodiments. The scope of the following claims is to be accorded the broadest interpretation to encompass all modifications, equivalent structures, and functions.

What is claimed is:

1. An image processing device comprising:
    an acquiring unit configured to acquire a first image of a scene;
    a display unit configured to display the first image of the scene;
    and a control unit configured to divide the scene displayed into a plurality of regions, receive a selection of a first color balance value for a first region of the plurality of regions, receive a selection of a second color balance value for a second region of the plurality of regions, adjust a color balance value of the first region according to the first color balance value, adjust a color balance value of the second region according to the second color balance value, and instruct the acquiring unit to capture a second image of the scene according to the adjustments made to the first region and the second region;
    wherein the control unit is configured to determine whether capturing the second image requires exposure bracketing based on the respective color balance value of each region.

2. The image processing device according to claim 1, wherein a user selects the region on the display unit and the color balance value of the region is adjusted by the control unit in accordance with an instruction from the user.

3. The image processing device according to claim 2, wherein at least one color histogram is displayed on the display unit subsequent to the user selecting the region.

4. The image processing device according to claim 3, wherein the user selects the color balance value from the at least one color histogram to adjust the color balance value of the selected region.

5. The image processing device according to claim 1, wherein the display unit displays a color histogram corresponding to each region displayed on the display unit.

6. The image processing device according to claim 1, wherein the control unit is configured to determine an exposure value based on the color balance value adjustments made for each region.

7. The image processing device according to claim 1, wherein the display unit is a light-emitting diode (LED) screen.

8. The image processing device according to claim 1, wherein the display unit is a touch screen and a user may select the region by directly contacting the region located on the touch screen.

9. The image processing device according to claim 1, wherein the control unit divides the image displayed and adjusts the color balance value of each region based on user inputs.

10. The image processing device according to claim 1, wherein a size of the region is adjustable and a number of the plurality of regions is adjustable.

11. A method for selective color balance adjustments on an image-capturing device, the method comprising:
   displaying a first image of a scene;
   dividing the scene displayed into a plurality of regions;
   receiving a selection of a first color balance value for a first region of the plurality of regions;
   receiving a selection of a second color balance value for a second region of the plurality of regions;
   adjusting a color balance value of the first region according to the first color balance value;
   adjusting a color balance value of the second region according to the second color balance value;
   and instructing the image capturing device to capture a second image of the scene according to the adjustments made to the first region and the second region; wherein the control unit is configured to determine whether capturing the second image requires exposure bracketing based on the respective color balance value of each region;
   wherein the control unit is configured to determine whether capturing the second image requires exposure bracketing based on the respective color balance value of each region.

12. The method according to claim 11, wherein the color balance value for more than one region from the plurality of regions are adjusted before the image is stored onto an image storing unit associated with the image-capturing device.

13. The method according to claim 11, wherein the user selects a number of regions to divide the image via a user interface associated with the image-capturing device.

14. The method according to claim 13, wherein the user selects the region to be color balanced via the user interface.

15. The method according to claim 14, wherein the user selects a color balance value for the selected region and enters the color balance value via the user interface.

16. An image processing device comprising:
   an acquiring unit configured to acquire a first image of a scene;
   a display unit configured to display the first image of the scene;
   and a control unit configured to divide the scene displayed into a plurality of regions, receive a first color balance value for a first region of the plurality of regions, receive a second color balance value for a second region of the plurality of regions, adjust a color balance value of the first region according to the first color balance value, adjust a color balance value of the second region according to the second color balance value, and instruct the acquiring unit to capture a second image of a scene according to the adjustments made to the first region and the second region;
   wherein the control unit is configured to determine whether capturing the second image requires exposure bracketing based on the respective color balance value of each region.

17. The image processing device according to claim 16, wherein a user selects the region on the display unit and the color balance value of the region is adjusted by the control unit in accordance with an instruction from the user.

18. The image processing device according to claim 17, wherein at least one color histogram is displayed on the display unit subsequent to the user selecting the region.

19. The image processing device according to claim 18, wherein the user selects the color balance value from the at least one color histogram to adjust the color balance value of the selected region.

20. An image processing method comprising:
   acquiring a first image of a scene;
   displaying the first image of the scene;
   and dividing the scene displayed into a plurality of regions, receive a first color balance value for a first region of the plurality of regions, receive a second color balance value for a second region of the plurality of regions, adjust a color balance value of the first region according to the first color balance value, adjust a color balance value of the second region according to the second color balance value, and instruct the acquiring unit to capture a second image of a scene according to the adjustments made to the first region and the second region;
   wherein the control unit is configured to determine whether capturing the second image requires exposure bracketing based on the respective color balance value of each region.

21. An image processing device comprising:
   an acquiring unit configured to acquire a first image of a scene;
   and a control unit configured to divide the acquired scene into a plurality of regions, receive a first color balance value for a first region of the plurality of regions, receive a second color balance value for a second region of the plurality of regions, adjust a color balance value of the first region according to the first color balance value, adjust a color balance value of the second region according to the second color balance value, and instruct the acquiring unit to capture a second image of a scene according to the adjustments made to the first region and the second region;
   wherein the control unit is configured to determine whether capturing the second image requires exposure bracketing based on the respective color balance value of each region.

22. The image processing device according to claim 21, wherein the control unit is configured to determine an exposure value based on the color balance value adjustments made for each region.

23. The image processing device according to claim 21, wherein the control unit is configured to determine whether capturing the second image requires exposure bracketing based on the respective color balance value of each region.

24. An image processing method comprising:
acquiring a first image of a scene;
and dividing the acquired scene into a plurality of regions, receive a first color balance value for a first region of the plurality of regions, receive a second color balance value for a second region of the plurality of regions, adjust a color balance value of the first region according to the first color balance value, adjust a color balance value of the second region according to the second color balance value, and instruct the acquiring unit to capture a second image of a scene according to the adjustments made to the first region and the second region
wherein the control unit is configured to determine whether capturing the second image requires exposure bracketing based on the respective color balance value of each region.

* * * * *